Dec. 2, 1969 EIICHI TAKANO 3,481,664
LARGE APERTURE AND WIDE ANGLE ZOOM LENS SYSTEM
Filed Sept. 1, 1965 2 Sheets-Sheet 1
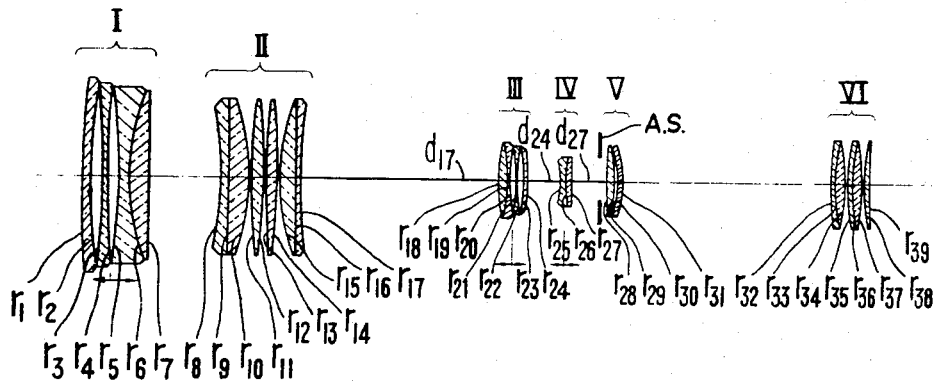
FIG. 1
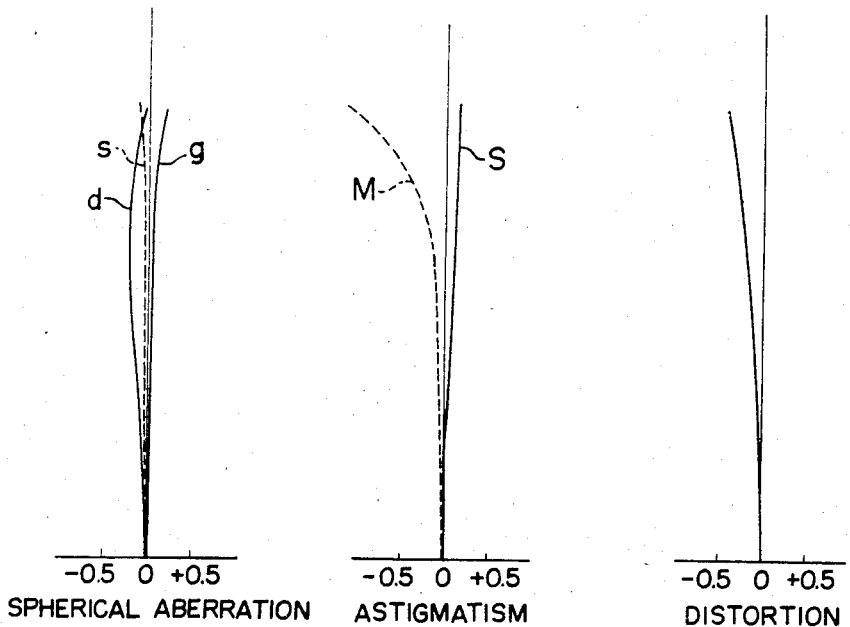
FIG. 2
f=39.5mm
INVENTOR.
EIICHI TAKANO
BY
ATTORNEY f=164.70mm f=375.96mm 3,481,664
LARGE APERTURE AND WIDE ANGLE ZOOM LENS SYSTEM
Eiichi Takano, Tokyo, Japan, assignor to Canon Camera Kabushiki Kaisha, Ohta-ku, Tokyo, Japan, a corporation of Japan
Filed Sept. 1, 1965, Ser. No. 484,290
Int. Cl. G02b 1/00, 9/00; B29d 15/00
U.S. Cl. 350—176    2 Claims

ABSTRACT OF THE DISCLOSURE

A large aperture and wide angle zoom lens system having a short minimum distance of shooting and a long back focal length at the upper limit of a higher zoom ratio and wider field of view comprising a focusing lens group consisting of a divergent lens system movable only for focusing independently of zooming, a front lens group consisting of a stationary converging lens system, a variator lens group comprising a diverging lens system movable in the axial direction, a compensator lens group comprising a divergent lens system movable in conjunction with the variator for maintaining the position of the focal plane of the lens system constant throughout the zoom range, and a first and a second rear lens group each comprising a stationary converging lens system.

---

Figure 3:
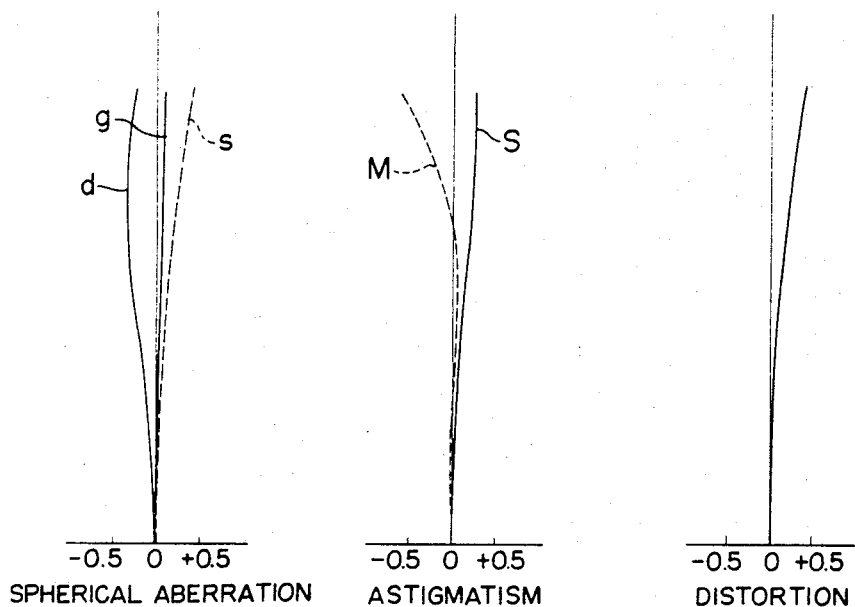

This invention relates to a wide angle zoom lens system suitable for television cameras or the like, which is well corrected for aberrations throughout the whole zooming range, especially at the greater zoom ratios.

In known zoom lens systems of the type used for three tube color television cameras, there has been required a very complicated optical system wherein an image is formed by the shooting lens on, or in the proximity of, a field lens and then transmitted by a relay lens system on to the camera tube surface. For the four tube separate luminance television camera, a much more complicated optical system has been required. They are also inconvenient in as much as the field lens must be exchanged each time the shooting lens is exchanged. Moreover, zoom lenses, especially those used for television where it is often required to make an image of a small article over the whole field of view, are required to have a very short minimum distance of shooting and therefore a large zoom ratio. This requirement is relatively incompatible with the requirement of good correction for various aberrations, and it has hithertofore been next to impossible to satisfy both such requirements.

Furthermore, an additional zoom lens system has been necessary for use in television studios since there has been no high speed zoom lens system throughout its zoom range and whose zoom range is of a sufficiently wide region that the field angle is more than 50° in its shortest focal length condition.

It is an object of the invention to provide a wide angle zoom lens system which over its entire zoom range has a back focal length more than five times as large as the focal length in its shortest focal length adjustment. With such sufficient back focal length, the zoom lens system of the invention when used in the three way color TV is capable of forming an image directly on the image orthicon without using any relay lens system, whereby each channel can afford to shart the light flux. Also when used as a usual zoom lens, it does not require interchanging the field lens since the position of the exit pupil is maintained constant regardless of the variation of the focal length.

Usually, to achieve the same purpose, an extremely retrofocus type lens system results, because the rear principal point must exist far behind the lens system in its shortest focal length position with deterioration in the various aberrations, especially the Petzval sum, to such an extent that their correction would become difficult even with a single lens, not to say anything about a zoom lens. The present invention has overcome such difficulty.

It is another object of the invention to provide a wide angle zoom lens system which has its very shortest and minimum distance of shooting less than five times the focal length at its longest focal length position, while retaining a zoom ratio of about ten magnifications.

In order to maintain the F number constant within the whole zoom range, the light flux focussed in the image plane on the optical axis should have a width ($2p$) expressed by the formula $2p = fz/F$ in a plane tangential to the front lens surface at a point of the optical axis, where $fz$ is the focal length for each zoom position Z. In the present invention, since the zoom ratio is ten magnifications, $fz$ varies by a factor of ten and hence $p$ also varies by a factor of ten. On the other hand, a zoom lens should be of the front lens focussing method in order to satisfy a certain zoom equation for all distances of shooting. Unless $F_F$ is defined by $F_F = f_F/P_{max}$, where $f_F$ denotes the focal length of the front focussing lens and $P_{max}$ denotes the maximum of P, is above a certain value, it is not possible to correct for various aberrations, such as spherical aberration. Therefore it should be that $f_F \gg f_{min}$, where $f_{min}$ is the minimum value of $f_z$. It is noted that the amount of movement of front lens for focussing is proportional to $(f_F)^2$ and therefore, by far, is greater than the amount of movement of a single lens with focal length $f_{min}$ which is proportional to $(f_{min})^2$, and yet the same field angle is obtained when the focal length of the zoom lens is $f_{min}$. In order to avoid vignetting in the marginal area of the field for all values of $f_z$ whilst permitting a large amount of movement proportional to $(f_F)^2$, the diameter of the focussing lens must be chosen to be very much greater for objects at short distances.

It is a further object of the invention to provide a wide angle zoom lens systems which has a high zoom ratio of 10 while continuously maintaining an aperture of $F_4$, and whose zoom range lies within a wide range of the field angle more than 50° at the shortest focal length position, whereby the necessity for using two lenses in television studios can be eliminated.

It is a still further object of the invention to provide a wide angle zoom lens system which is well corrected for various aberrations throughout its zoom range whilst simultaneously fulfilling the three objects mentioned above.

Figure 4:
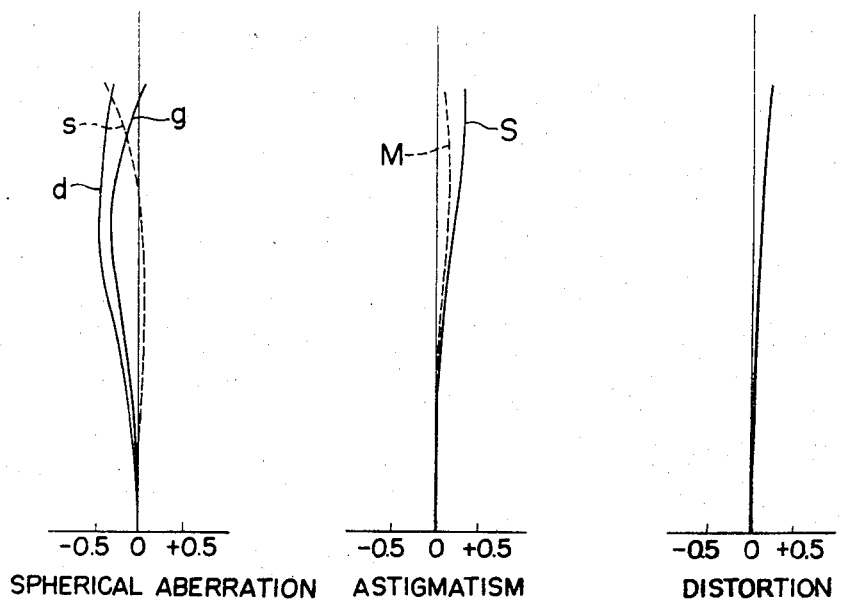

Other objects, advantages and features of this invention will become more apparent from the following descriptions of an illustrative embodiment read in conjunction with the drawing, in which:

FIG. 1 is a side elevation illustrating a wide angle zoom lens system in accordance with the invention; and FIGS. 2–4 are diagrams showing the aberration correction at three different conditions of zooming.

Referring to FIG. 1, a zoom lens system in accordance with the invention is shown comprising six groups of lenses I to VI, respectively.

The front lens consists of the first group I and the second group II. The first group I is a focussing lens comprising a divergent lens system which is stationary during zooming but is movable for the purpose of focussing regardless of zooming. This lens will hereinafter be referred to as the "focussing" lens I.

The second group II is a converging lens system and constitutes a stationary front lens.

The third group III is a diverging lens system and constitutes a "variator" that is movable, through a large stroke in the axial direction, to vary the magnification.

The fourth group IV is a diverging lens system and constitutes a "compensator" that is moved in relation with the third group III to maintain constant the position of the focal plane throughout the zoom range.

The fifth group V is a stationary converging lens system and will hereinafter be referred to as the "rear first lens."

The sixth group VI is a stationary converging lens system and will hereinafter be referred to as the "rear second lens."

The above zoom lens system is constructed as to satisfy the following five conditions:

(1) The aperture stop AS in the complete system is positioned in front of the rear first lens V, as close to the compensator IV as possible, as not to interfere mechanically with it. The focal length of the rear first lens V is so chosen that the equivalent focal length, of lenses I to V combined, will always be negative throughout the zoom range and the absolute value of said focal length at the shortest focal length position will be 1.5–2.5 times the focal length $f_{min}$ of the complete zoom lens system at its shortest focal length position. Furthermore the focal length $f_{III}$ of the variator III is so chosen as to be in a range of 2.2–1.6 times $f_{min}$.

(2) The focussing lens I has a negative focal length $f_F$ whose absolute value is less than two-thirds of the focal length $f_{max}$ of the complete zoom lens system at its longest focal length position. The front lens II has a positive focal length $f_{fr}$, its absolute value being less than two-thirds of $f_F$ and the spacing between its principal points being (0.23–0.33) $f_{max}$. The equivalent focal length of front lenses I and II combined is in the range of 3/5–1 of $f_{max}$.

(3) The refractive index of the glass of each lens comprising the variator III is more than 1.8, that of the glass of each lens of the compensator IV is more than 1.7 The refractive index of the each negative single lens belonging to the lenses making up the focussing lens I is more than 1.65, and that of the each positive single lens belonging to the lenses making up the front lens II is less than 1.55. The refractive index of the each of the positive single lenses of the rear first lens is less than 1.55.

(4) In the front lens II, there are included at least two negative single lenses and their difference in Abbe number from the positive single lenses thereof is at least more than 35.

These negative lenses are each cemented together with a respective one of these positive lenses and the centers of curvature of the cemented surfaces are located at the points directing their directions toward the optical axis from the points at which said surfaces are crossed by the marginal ray of a light flux leading to the center of the field of view.

(5) The rear first lens V is composed of at least a separate simple positive lens and at least one simple negative lens. In the rear second lens VI there are at least two doublets of positive and negative lenses of biconvex form, the cemented interface of each doublet being divergent, with its center of curvature being located to the opposite side of the stop from the point at which said interface crosses the optical axis.

The zoom lens system in accordance with this invention is constructed on the foregoing conditions and reference will now be made to its functions:

(A) In order to have the stop aperture AS position fixed and to maintain the F-value constant, independently of zooming, it is necessary that the stop should be disposed behind all of the movable lenses, whereas the stop should be positioned as close to the focussing lens as possible, for the purpose of aberration correction and for making the diameters of the focussing lens I and of the front lens II small. In the present invention the position of the stop is determined by this condition.

To obtain a long back focal length, the first through fifth groups of lenses I–V must be formed as negative lenses, with the rear second lens VI as a positive lens system, and both combined should form a retrofocus type positive lens system. In order to achieve proper control of the aberration correction, especially of the Petzval sum, the rear first lens V should be provided close to the stop, so that the light flux concentrating to the axial object point may cross the lens surface at a lower point at the position of lens V, and at a higher point at the position of the rear second lens VI, as measured from the optical axis.

It is also required that the refractive power and the spacings between the principal points of both be appropriately determined to accommodate the entire system within a suitable size and to correct for aberrations such as Petzval sum or the like within suitable limits.

It is important to select a proper focal length of the variator for the purpose of correcting for aberrations, particularly for the Petzval sum.

(B) As H. H. Hopkins says in the Proceedings of the London Conference on Optical Instruments, 1950, pp. 17–32, a zoom lens system with a single variator is suitable for use as a lens of a great zoom ratio, when the single variator is a diverging lens system, preceded by a stationary converging lens system. In the prior art, however, where the variator is preceded by a group of converging lenses which is stationary during zooming and movable only during focussing, the selection of the focal length and the amount of movement involves such difficulty as mentioned before in connection with the second object of the present invention and it is not practically possible to focus up to the short distance object point.

In accordance with the present invention, the lens system, disposed ahead of the variator III which stays stationary during zooming, is divided into two groups I and II which combinedly provide a converging lens systems, of which the front lens group I is a diverging lens system and the rear group II is a converging lens system, with proper relationship between the refractive powers of lens groups I and II. Thus, with the combined system of groups I and II being a positive lens system and the third group, the variator III, being a negative lens system, there is provided a lens system of great zoom ratio, retaining the advantages reported by H. H. Hopkins.

Moreover, the use of the diverging lens system group I as the focussing lens presents two additional advantages. One of the advantages is that less movement for focussing a short distance object point is required as compared with a positive lens having the same focal length, since the first focal point of the lens system of group I is, unlike a positive lens system, on the opposite side from the object point. The other is that the increase in the effective aperture of the first group I required to avoid vignetting in the marginal portion of the field is smaller for a given amount of movement as compared to a positive lens system since the ray entering at a large angle to the optical axis and leading to the marginal part of the field will be bent to a smaller angle by the negative lens system. As the focal length of the system is shortened, this advantage will become greater, but the Petzval sum will be shifted negative and the aberration correction will become difficult. Besides, if the ratio of the focal length of the focussing lens I to that of the front lens II is not taken properly, the effective aperture of one of them will be too much greater than that of the other.

The conditions required for correction of these aberrations and proper maintenance of the focal lengths of the two lens groups are the aforementioned condition (2) in accordance with the invention given to the refractive power and principal point spacing.

(C) A zoom lens of a great zoom ratio made under the conditions (1) and (2) as mentioned before would suffer a considerable shift of Petzval sum toward negative. In order to avoid this, it is necessary to select a very high value of index of refraction for each of the glasses of the variator that has the most intense diverging power in the complete system (this is determined by the zoom equation and conditions (1) and (2) above), and to select a high value of refractive index for the glass of the compensator and the focussing lens which has the next strongest diverging power, and to select a low value of such index for the single lenses that have strong positive power. These are satisfied by condition (3), stated above.

(D) As stated in connection with the second object of this invention, $P_{max}$. would be very great in a zoom lens of great zoom ratio. If the condition (2) is satisfied, the marginal ray of the light flux going to the center of the field will cross the refractive surface of the front lens at a point spaced from the optical axis, and the front lens will have a stronger positive refractive power compared with the case where a one-group positive lens system is positioned preceding the variator as in the prior art, while, on the other hand, the path in the front and focussing lenses taken by the light flux going to the same point in the field, will vary during zooming. Therefore, unless these two lens groups I and II are almost perfectly achromatised separately, considerable chromatic spherical aberration will be produced at the longest focal length zoom position as well as a variation in the magnification of chromatic aberration due to zooming. These problems are eliminated when the previously mentioned condition (4) is fulfilled. Cementing the positive and negative lenses together is preferred, thought not necessary, to avoid the effect of machining error and to realize the performance as estimated by design.

(E) The position, in the focussing lens I, the front lens II, the variator III and in the compensator IV, taken by the light flux leading to the same point in the image field varies during zooming, while in both the rear first lens V and the rear second lens VI it does not.

It is therefore necessary that the variation of aberrations, due to zooming, be eliminated in the first mentioned four groups, and the constant deviation of aberration from a desired value be eliminated in the two last mentioned groups. The condition (5) is provided to meet such requirements.

Since the rear first lens V is positioned close to the stop AS its coefficient of third order astigmatism is nearly constant regardless of the lens forms and cannot be controlled by means of the rear first lens V, once its refractive power has been determined on the basis of aberration theory. To cancel the deviation of astigmatism in lens groups I through V, the rear second lens VI provides for the control of the coefficient of astigmatism as it is spaced from the stop. It is only necessary that there be at least one divergent surface in the rear second lens VI that has its center of curvature on the side opposite to the stop as seen from the point of intersection of the surface with the optical axis. Usually this is achieved by introducing into the rear second lens a thick meniscus lens of relatively small refractive power, which also serves to correct the deviation of distortion from the desired value.

This results, however, in a decrease of the back focal length of the whole system and a negative deviation of the Petzval sum to such an extent that the purpose of this invention may not be achieved. These problems have been solved, however, by giving the condition (5) to the rear lenses V and VI. Correction of chromatic aberration with a set of cemented lenses is possible by proper choice of their Abbe number, and correction of astigmatism and distortion from their desired values with a single cemented divergent interface is possible by proper choice of the difference in indicies between its two constituent lens elements and of the difference in their respective radii of curvature. But the resulting spherical aberrations and coma cannot be corrected by the rear first lens V, and it is for this reason that the two pairs of cemented lenses are required.

Although, by proper design of the rear second lens VI, as stated above, it is possible to avoid deviations from the desired values of aberrations, such as distortion, astigmatism appearing mainly around the marginal parts of the field, the remaining aberrations around the center part of the field, spherical aberration and coma must be corrected by the rear first lens V for their deviation from the desired value. Fortunately, since the rear first lens V is located in the proximity of the stop AS and comprises two groups of separate positive and negative lenses, they have the freedom to correct simultaneously both spherical aberration and coma without substantial disturbance of the astigmatic aberration and distortion.

TABLE 1

| Composite $f$ | $f$ | Group | r No. | r value | d | $n_d$ | $\nu$ |
|---|---|---|---|---|---|---|---|
| 236.7 | −260 | I | | | | 1.0 | |
| | | | 1 | 947.50268 | 5.0 | 1.713 | 53.9 |
| | | | 2 | 305.84 | 11.264 | 1.0 | |
| | | | 3 | −1975.0 | 5.0 | 1.713 | 53.9 |
| | | | 4 | 610.0 | 8.645 | 1.0 | |
| | | | 5 | −652.48 | 10.0 | 1.67003 | 47.2 |
| | | | 6 | 171.74 | 16.0 | 1.72825 | 28.3 |
| | | | 7 | ∞ | 62.772725 | 1.0 | |
| | 180.1 | II | 8 | −308.57 | 6.0 | 1.7552 | 27.5 |
| | | | 9 | −1905.8 | 21.0 | 1.48749 | 70.0 |
| | | | 10 | −162.48 | 0.1 | 1.0 | |
| | | | 11 | 1229.45 | 10.0 | 1.48749 | 70.0 |
| | | | 12 | −379.98 | 0.1 | 1.0 | |
| | | | 13 | 340.42 | 10.0 | 1.48749 | 70.0 |
| | | | 14 | −1975.0 | 0.1 | 1.0 | |
| | | | 15 | 169.98 | 15.0 | 1.48749 | 70.0 |
| | | | 16 | 2633.33 | 4.0 | 1.7552 | 27.5 |
| | | | 17 | 405.8509 | $d_{17}$ | 1.0 | |
| | −77 | III | 18 | 372.49 | 7.0 | 1.92286 | 20.9 |
| | | | 19 | −118.53 | 2.0 | 1.841 | 43.2 |
| | | | 20 | 118.53 | 4.208 | 1.0 | · |
| | | | 21 | −618.65 | 2.0 | 1.883 | 41.0 |
| | | | 22 | 262.8 | 4.405 | 1.0 | |
| | | | 23 | −134.77 | 2.0 | 1.883 | 41.0 |
| | | | 24 | −369.15045 | $d_2$ | 1.0 | |
| | −192.5 | IV | 25 | −103.94 | 5.0 | 1.757 | 47.7 |
| | | | 26 | 255.71 | 5.0 | 1.78472 | 25.7 |
| | | | 27 | −413.00332 | $d_{27}$ | 1.0 | |
| | 229.27 | V | 28 | 213.51 | 6.5 | 1.48749 | 70.0 |
| | | | 29 | −106.76 | 2.5 | 1.0 | |
| | | | 30 | −63.19 | 2.0 | 1.80518 | 25.5 |
| | | | 31 | −79.19153 | 176.29316 | 1.0 | |
| | 191.78 | VI | 32 | ∞ | 2.0 | 1.66446 | 35.9 |
| | | | 33 | 243.56 | 8.5 | 1.4645 | 65.7 |
| | | | 34 | −194.83 | 0.1 | 1.0 | |
| | | | 35 | 495.75 | 2.0 | 1.66446 | 35.9 |
| | | | 36 | 163.1 | 8.5 | 1.4645 | 65.7 |
| | | | 37 | −321.82 | 0.1 | 1.0 | |
| | | | 38 | 409.09 | 5.7 | 1.62041 | 60.3 |
| | | | 39 | −1039.3723 | 50.0 | 1.0 | |
| | | | 40 | ∞ | 82.2 | 1.51633 | 64.1 |
| | | | 41 | ∞ | | | |

TABLE 2

| d | Effective field surface, 40 mm. $\phi$ | | |
|---|---|---|---|
| | f | | |
| | 39.5 | 164.70 | 375.96 |
| $d_{17}$ | 3.7540141 | 164.30958 | 216.35120 |
| $d_{21}$ | 217.29270 | 31.423073 | 4.6955089 |
| $d_{27}$ | 6.8377210 | 32.151784 | 6.8377210 |

Thus, by fulfilling the aforementioned condition (5), deviation of all aberrations from their desired value may be corrected.

Shown in preceding Table 1 is some data for an illustrative embodiment of the invention shown in FIG. 1. It is to be noted that in this embodiment the aberration correction is provided with a parallel surface, equivalent to such group of parallel surfaces required to divide light flux for use in a color television and it should be understood that the condition for the back focal length stated in regard to the first mentioned object of the invention is applicable in the absence of such equivalent parallel plane. The shortest distance for focussing is 1.5 meters from the front surface of the front lens and the aperture is $F_4$. Table 1 shows the constructional data of the preferred zoom lens system in accordance with the invention.

Table 2 shows the air spacings between the front lens II and the front lens III, between the front lens III and the variator IV, and between the variator IV and the compensator V, respectively, at three different zooming steps corresponding to focal lengths of 39.5, 164.70 and 375.96 millimeters. In Tables 1 and 2, $f$ denotes focal length, $\gamma$ subscript the radius of curvature of the successive lens element surfaces, $d$ subscript the thickness of the successive lens element or air space, $n$ subscript the refractive indices for the $d$-line of the spectrum, and $\nu$ subscript the Abbe number of optical material.

FIGS. 2-4 show the aberration graphs for the preferred embodiment of FIG. 1. As can be seen from these the subject-matters stated in connection with the objects of the invention are well realized.

In FIGS. 2-4, the symbols are as follows:

$d$: the aberration with respect to $d$-line of the spectrum
$g$: the aberration with respect to $g$-line of the spectrum,
M: the meridional curvature, and
S: the sagittal curvature.

It will be understood that this invention is not limited to the specific materials, figures, etc., and other details described above and illustrated in the drawing, but can be carried out with various modifications without departing from the scope of the invention, as defined in the appended claims.

What is claimed is:
1. A high aperture and wide angle zoom lens system having a short minimum distance of shooting and a long back focal length at the upper limit of a higher zoom ratio and wider field of view and comprising a rear lens group and a forward lens group consisting of a focusing lens group I of a divergent lens system movable only for focusing independently of zooming, a front lens group II of a stationary converging lens system, a variator lens group III of a divergent lens system movable in the axial direction to vary the magnification, a compensator lens group IV of a divergent lens system movable in association with said variator for maintaining the position of the focal plane of the lens system constant throughout the zoom range; said variator III moving towards said compensator IV as the phototaking operation shifts from wide angle to telephoto while said compensator moves from the position of wide angle to the same position through a line convex to the variator III, said

TABLE I

| Composite $f$ | $f$ | Group | No. | $r$ value | $d$ | $n_d$ | $\nu$ |
|---|---|---|---|---|---|---|---|
| 236.7 | −260 | I | 1 | 947.50268 | | 1.0 | |
| | | | | | 5.0 | 1.713 | 53.9 |
| | | | 2 | 305.84 | | | |
| | | | | | 11.264 | 1.0 | |
| | | | 3 | −1975.0 | | | |
| | | | | | 5.0 | 1.713 | 53.9 |
| | | | 4 | 610.0 | | | |
| | | | | | 8.645 | 1.0 | |
| | | | 5 | −652.48 | | | |
| | | | | | 10.0 | 1.67003 | 47.2 |
| | | | 6 | 171.74 | | | |
| | | | | | 16.0 | 1.72825 | 28.3 |
| | | | 7 | ∞ | | | |
| | | | | | 62.772725 | 1.0 | |
| | 180.1 | II | 8 | −308.57 | | | |
| | | | | | 6.0 | 1.7552 | 27.5 |
| | | | 9 | −1905.8 | | | |
| | | | | | 21.0 | 1.48749 | 70.0 |
| | | | 10 | −162.48 | | | |
| | | | | | 0.1 | 1.0 | |
| | | | 11 | 1229.45 | | | |
| | | | | | 10.0 | 1.48749 | 70.0 |
| | | | 12 | −379.98 | | | |
| | | | | | 0.1 | 1.0 | |
| | | | 13 | 340.42 | | | |
| | | | | | 10.0 | 1.48749 | 70.0 |
| | | | 14 | −1975.0 | | | |
| | | | | | 0.1 | 1.0 | |
| | | | 15 | 169.98 | | | |
| | | | | | 15.0 | 1.48749 | 70.0 |
| | | | 16 | 2633.33 | | | |
| | | | | | 4.0 | 1.7552 | 27.5 |
| | | | 17 | 405.8509 | | | |
| | | | | | $d_{17}$ | 1.0 | |
| | −77 | III | 18 | 372.49 | | | |
| | | | | | 7.0 | 1.92286 | 20.9 |
| | | | 19 | −118.53 | | | |
| | | | | | 2.0 | 1.841 | 43.2 |
| | | | 20 | 118.53 | | | |
| | | | | | 4.208 | 1.0 | |
| | | | 21 | −618.65 | | | |
| | | | | | 2.0 | 1.883 | 41.0 |
| | | | 22 | 262.8 | | | |
| | | | | | 4.405 | 1.0 | |
| | | | 23 | −134.77 | | | |
| | | | | | 2.0 | 1.883 | 41.0 |
| | | | 24 | −369.15045 | | | |
| | | | | | $d_{24}$ | 1.0 | |
| | −192.5 | IV | 25 | −103.94 | | | |
| | | | | | 5.0 | 1.757 | 47.7 |
| | | | 26 | 255.71 | | | |
| | | | | | 5.0 | 1.78472 | 25.7 |
| | | | 27 | −413.00332 | | | |
| | | | | | $d_{27}$ | 1.0 | |
| | 229.27 | V | 28 | 213.51 | | | |
| | | | | | 6.5 | 1.48749 | 70.0 |
| | | | 29 | −106.76 | | | |
| | | | | | 2.5 | 1.0 | |
| | | | 30 | −63.19 | | | |
| | | | | | 2.0 | 1.80518 | 25.5 |
| | | | 31 | −79.19153 | | | |
| | | | | | 176.29316 | 1.0 | |
| | 191.78 | VI | 32 | ∞ | | | |
| | | | | | 2.0 | 1.66446 | 35.9 |
| | | | 33 | 243.56 | | | |
| | | | | | 8.5 | 1.4645 | 65.7 |
| | | | 34 | −194.83 | | | |
| | | | | | 0.1 | 1.0 | |
| | | | 35 | 495.75 | | | |
| | | | | | 2.0 | 1.66446 | 35.9 |
| | | | 36 | 163.1 | | | |
| | | | | | 8.5 | 1.4645 | 65.7 |
| | | | 37 | −321.82 | | | |
| | | | | | 0.1 | 1.0 | |
| | | | 38 | 409.09 | | | |
| | | | | | 5.7 | 1.62041 | 60.3 |
| | | | 39 | −1039.3723 | | | |
| | | | | | 50.0 | 1.0 | |
| | | | 40 | ∞ | | | |
| | | | | | 82.2 | 1.51633 | 64.1 |
| | | | 41 | ∞ | | | |

TABLE II

| d | Effective field surface, 40 mm. $\phi$ | | |
|---|---|---|---|
| | f | | |
| | 39.5 | 164.70 | 375.96 |
| $d_{17}$ | 3.7540141 | 164.30958 | 216.35120 |
| $d_{24}$ | 217.29270 | 31.423073 | 4.6955089 |
| $d_{27}$ | 6.8377210 | 32.151784 | 6.8377210 | focusing lens group I being composed of two airspaced negative singlets followed by a negative doublet, said front lens group II being composed of a front doublet, a rear doublet and two positive singlets therebetween, said variator III being composed of a doublet followed by two negative singlets, said compensator being composed of a negative doublet; said rear lens group consisting of a first lens group V and a second lens group VI, each consisting of a stationary converging lens system, said first rear lens V being composed of two air-spaced positive singlets, and the second rear lens VI being composed of two air-spaced doublets followed by a singlet; the numerical values of the radii of curvature $r$ subscripts of said focusing lens group I, said front lens group II, said variator lens group III, said compensator lens group IV, said first rear lens group V and the second rear lens group VI, and of the axial thicknesses and air spaces thereof, the refractive indices of said lenses and their Abbe numbers $\nu$ being substantially as given in preceding Table I and the air spaces $d_{17}$, $d_{24}$ and $d_{27}$ representing air spacings between the front lens II and the variator III, the variator III and the compensator IV and the compensator IV and the first rear lens V, respectively, at three different zooming steps corresponding to focal lengths of 39.5, 164.70 and 375.96 millimeters being substantially as given in Table II.

2. In a high aperture and wide angle zoom lens system having a short minimum distance of shooting and a long back focal length at the upper limit of a higher zoom ratio and wider field of view and including a rear lens group; the combination therewith of a forward lens group consisting of a focusing lens group I of a divergent lens system movable only for focusing independently of zooming, a front lens group II of a stationary converging lens system, a variator lens group III of a divergent lens system movable in the axial direction to vary the magnification, a compensator lens group IV of a divergent lens system movable in association with said variator for maintaining the position of the focal plane of the lens system constant throughout the zoom range; said variator III moving towards said compensator IV as the phototaking operation shifts from wide angle to telephoto while said compensator moves from the position of wide angle to the same position through a line convex to the variator III, said focusing lens group I being composed of two air-spaced negative singlets followed by a negative doublet, said front lens group II being composed of a front doublet, a rear doublet and two positive singlets therebetween, said variator III being composed of a doublet followed by two negative singlets, said compensator being composed of a negative doublet; the numerical values of $r_1$ to $r_{27}$ of said focusing lens group I, said front lens group II, said variator lens group III, and said compensator lens group IV, and of the axial thicknesses and air spaces thereof, the refractive indices of said lens and their Abbe numbers $\nu$ being substantially as given in the following Table I and the spaces $d_{17}$, $d_{24}$ and $d_{27}$ representing the air spacings between the front lens II and the variator III, the variator III and the compensator IV and the compensator IV and the rear lens group, respectively, at three different zooming steps corresponding to focal lengths of 39.5, 164.70 and 375.96 millimeters being substantially as given in Table II

TABLE I

| $f$ | Group | $r$ No. | $r$ value | $d$ | $n_d$ | $\nu$ |
|---|---|---|---|---|---|---|
| −260 | I | | | | 1.0 | |
| | | 1 | 947.50268 | 5.0 | 1.713 | 53.9 |
| | | 2 | 305.84 | 11.264 | 1.0 | |
| | | 3 | −1975.0 | 5.0 | 1.713 | 53.9 |
| | | 4 | 610.0 | 8.645 | 1.0 | |
| | | 5 | −652.48 | 10.0 | 1.67003 | 47.2 |
| | | 6 | 171.74 | 16.0 | 1.72825 | 28.3 |
| | | 7 | ∞ | 62.772725 | 1.0 | |
| 180.1 | II | 8 | −308.57 | 6.0 | 1.7552 | 27.5 |
| | | 9 | −1905.8 | 21.0 | 1.48749 | 70.0 |
| | | 10 | −162.48 | 0.1 | 1.0 | |
| | | 11 | 1229.45 | 10.0 | 1.48749 | 70.0 |
| | | 12 | −370.98 | 0.1 | 1.0 | |
| | | 13 | 340.42 | 10.0 | 1.48749 | 70.0 |
| | | 14 | −1975.0 | 0.1 | 1.0 | |
| | | 15 | 169.98 | 15.0 | 1.48749 | 70.0 |
| | | 16 | 2633.33 | 4.0 | 1.7552 | 27.5 |
| | | 17 | 405.8509 | $d_{17}$ | 1.0 | |
| −77 | III | 18 | 372.49 | 7.0 | 1.92286 | 20.9 |
| | | 19 | −118.53 | 2.0 | 1.841 | 43.2 |
| | | 20 | 118.53 | 4.208 | 1.0 | |
| | | 21 | −618.65 | 2.0 | 1.883 | 41.0 |
| | | 22 | 262.8 | 4.405 | 1.0 | |
| | | 23 | −134.77 | 2.0 | 1.883 | 41.0 |
| | | 24 | −369.15045 | $d_{24}$ | 1.0 | |
| −192.5 | IV | 25 | 103.94 | 5.0 | 1.757 | 47.7 |
| | | 26 | 255.71 | 5.0 | 1.78472 | 25.7 |
| | | 27 | −413.00332 | $d_{27}$ | 1.0 | |

TABLE II

| $d$ | Effective field surface, 40 mm. $\phi$ | | |
|---|---|---|---|
| | $f$ | | |
| | 39.5 | 164.70 | 375.96 |
| $d_{17}$ | 3.7540141 | 164.30958 | 216.35120 |
| $d_{24}$ | 217.29270 | 31.423073 | 4.6955089 |
| $d_{27}$ | 6.8377210 | 32.151784 | 6.8377210 |

References Cited

UNITED STATES PATENTS 3,346,320  10/1967  Macher _____ 350—184

JOHN K. CORBIN, Primary Examiner

U.S. Cl. X.R.

350—186, 214